US010199076B2

(12) United States Patent
Durrum et al.

(10) Patent No.: US 10,199,076 B2
(45) Date of Patent: Feb. 5, 2019

(54) CAVITY SEALING APPARATUS

(71) Applicant: Seagate Technology LLC, Cupertino, CA (US)

(72) Inventors: Thomas M. Durrum, Broomfield, CO (US); David Ray Lapp, Boulder, CO (US); Stephen G. Horning, Longmont, CO (US); Samuel Edward Severson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 502 days.

(21) Appl. No.: 14/882,604

(22) Filed: Oct. 14, 2015

(65) Prior Publication Data

US 2017/0110158 A1    Apr. 20, 2017

(51) Int. Cl.
*G11B 33/14* (2006.01)
*B65B 31/04* (2006.01)
*G11B 25/04* (2006.01)

(52) U.S. Cl.
CPC ........ *G11B 33/1486* (2013.01); *B65B 31/046* (2013.01); *G11B 25/043* (2013.01); *G11B 33/148* (2013.01)

(58) Field of Classification Search
CPC . G11B 33/1486; G11B 25/043; G11B 33/148; B65B 31/00; B65B 31/046; B67C 7/0073
See application file for complete search history.

(56) References Cited

U.S. PATENT DOCUMENTS

| 5,454,157 | A | 10/1995 | Ananth et al. |
| 6,644,362 | B2 | 11/2003 | Bernett |
| 7,218,473 | B2 | 5/2007 | Bernett et al. |
| 7,570,454 | B1 * | 8/2009 | Andrikowich ....... G11B 25/043 141/66 |
| 7,876,526 | B2 * | 1/2011 | Calderon ........... G11B 33/1466 360/99.21 |
| 8,199,425 | B1 | 6/2012 | Gustafson et al. |
| 2011/0261483 | A1 | 10/2011 | Campbell et al. |

* cited by examiner

*Primary Examiner* — Timothy L Maust
*Assistant Examiner* — Timothy P Kelly
(74) *Attorney, Agent, or Firm* — Crawford Maunu PLLC

(57) ABSTRACT

Certain exemplary aspects of the present disclosure are directed towards a manufacturing apparatus including a first chamber having a first cavity, and a first actuator. The first actuator aligns the opening of the first chamber to an opening in a second chamber having a second cavity, sealing the first cavity to the second cavity. The manufacturing apparatus further includes gas flow componentry that in conjunction with the first actuator and first chamber evacuate the second cavity by drawing a vacuum in the first cavity. After the second cavity is evacuated, the gas flow componentry fills the second cavity filled with a gas by introducing the gas to the first cavity. A second actuator seals the gas in the second cavity by applying a seal that covers the opening in the second chamber while the first and second cavity remains sealed to one another via the first actuator.

16 Claims, 6 Drawing Sheets

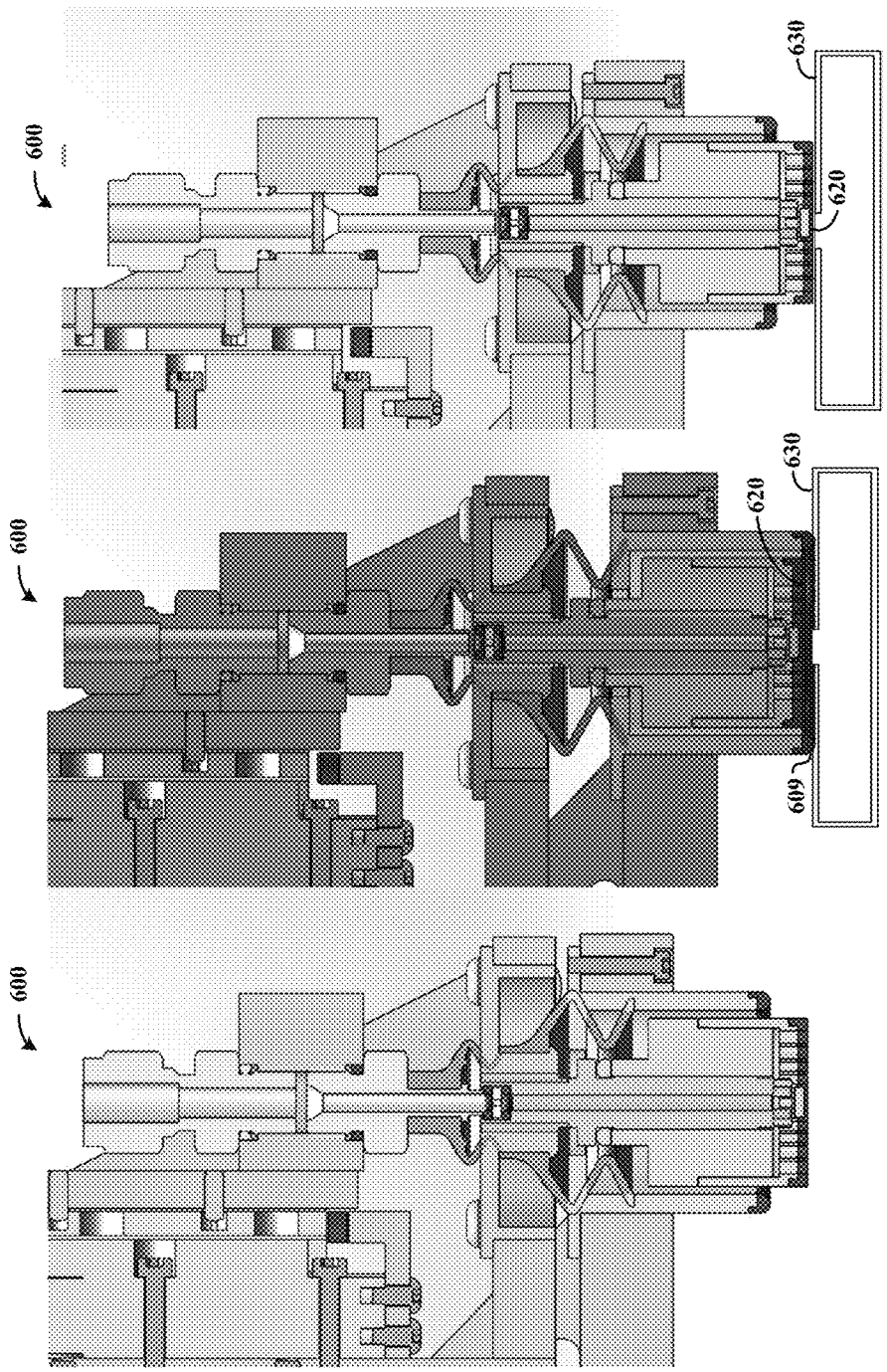

CAVITY SEALING APPARATUS

SUMMARY

Various example embodiments are directed to apparatuses and related methods involving the evacuation and subsequent filling of chambers with a specified gas (e.g., a single gas or a gas mixture). This evacuation and fill approach is carried out with a movable supply/chamber that is positioned to form a seal with the chamber to be filled, and further applies a seal to seal the gas within the chamber after filling. A variety of different types of chambers, such as a disc drive chamber with an evacuation/fill opening therein, can be evacuated, filled and finally sealed in this manner, providing flexible manufacturing implementations and addressing issues that may relate, for example, to large chamber evacuation.

Various embodiments of the present disclosure are directed to a manufacturing apparatus that partially assembles a housing including a cavity with electronic device(s) therein. In many embodiments, the manufacturing apparatus positions itself, relative to an opening in a cavity of the housing, and forms a seal with the opening, such as by imparting a seal around the opening that links a chamber in the apparatus with the cavity. The manufacturing apparatus evacuates the cavity of the housing to create a vacuum therein. Once a vacuum has been established in the cavity, the manufacturing apparatus fills the cavity with a gas. By evacuating the cavity prior to filling the cavity, the gas content in the resulting atmosphere within the cavity is tightly controlled. After filling the cavity, the manufacturing apparatus applies a seal to the cavity of the housing while maintaining the seal with the opening. This approach may, for example, involve adhering a metal or other material component to the housing and/or a cover of the housing, to cover/seal the opening therein. This may, for example, involve providing a hermetic seal that about prevents the exchange of gas into or out of the cavity. Such embodiments may address challenges relating to the migration of gas into or out of the cavity, which may otherwise damage and/or cause a complete failure of the electronic device(s) within the cavity.

One or more of these embodiments may be particularly applicable, for example, to disc drives in which a cavity between a base deck and a cover is hermetically sealed with a low-density gas in the disc drive. The resulting low-density atmosphere may facilitate reduced power requirements for a data storage medium revolving within the cavity. In yet further embodiments, the low-density atmosphere facilitates the transfer of heat from components of the disc drive to the base deck and cover, which is then dissipated to an external environment. In this context, aspects of the present disclosure facilitate the removal of undesirable atmospheric characteristics (e.g., friction and heat insulating aspects of air) by evacuating the cavity, refilling the cavity with the low-density gas and establishing a hermetic seal around the disc drive.

Various example embodiments are directed to an apparatus including a first chamber having a first cavity and an opening thereto, and a first actuator operable to align the opening of the first chamber to an opening of a second chamber having a second cavity, and to seal the first cavity to the second cavity via the opening. Once the first and second cavity are sealed to one another, gas flow componentry operates with a first actuator and the first chamber to evacuate the second cavity, via the openings, by drawing a vacuum in the first cavity. The gas flow componentry, after evacuating the second cavity, fills the second cavity with a gas via the openings by introducing the gas to the first cavity. Once filled with gas, a second actuator applies a seal that covers the opening in the second chamber, permanently (or semi-permanently) sealing the gas in the second cavity.

In other embodiments of the present disclosure, a hard disc drive assembly apparatus is disclosed including a chamber having an opening thereto. A mechanical component of the assembly apparatus positions a hard disc drive relative to the chamber, the hard disc drive having a cavity with an opening therein. A first actuator of the assembly apparatus seals the chamber to the disc drive cavity via the openings, and gas flow componentry evacuates the disc drive cavity, via the openings, by drawing a vacuum in the chamber. For instance, the first actuator may seal the cavities to one another by compressing a seal between respective surfaces of the first chamber and the second chamber. Once evacuated, the disc drive cavity is filled with a gas by introducing the gas to the chamber. The vacuum in the cavity draws the gas from the chamber to the cavity. A second actuator then seals the gas in the disc drive cavity by applying a seal to cover the opening in the disc drive, while the chamber is sealed to the disc drive cavity. In further embodiments, the mechanical component includes a conveyor that moves the hard disc drive in position, relative to the chamber, and operates in conjunction with the chamber, actuators and gas flow componentry to evacuate and fill respective ones of the disc drives as they are conveyed.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 6A-6C show an apparatus in various stages of operation, in accordance with one or more embodiments, in which FIG. 6A shows a stage for picking a seal, FIG. 6B shows a stage for evacuation and filling, and FIG. 6C shows a stage for applying a seal.

Figure 1:
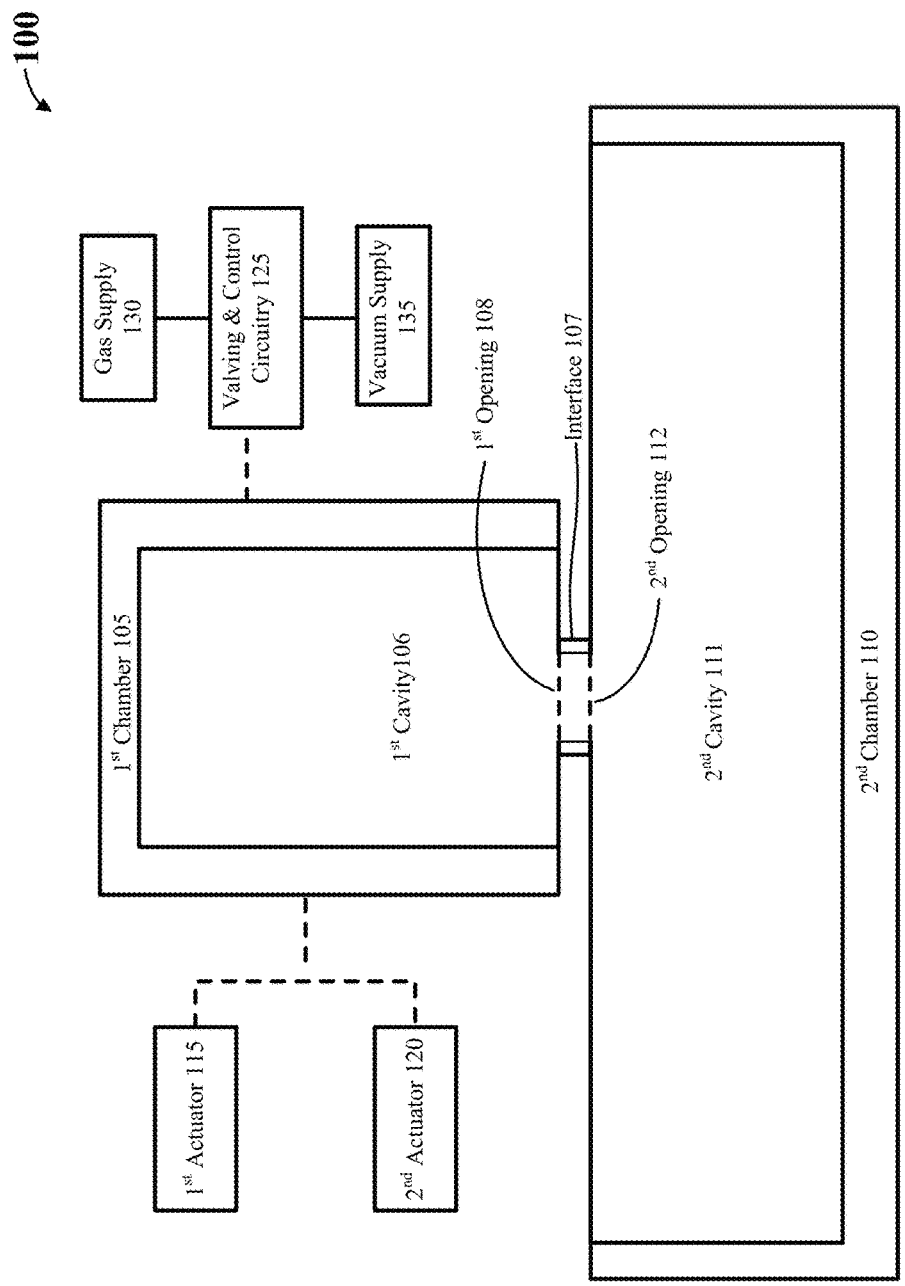
FIG. 1 is a cross-sectional side view of a disc drive sealing apparatus, consistent with various aspects of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements for evacuating a cavity of a chamber, filling the cavity with a gas, and sealing the cavity with the gas therein. Specific embodiments are believed to be particularly beneficial to the manufacture and implementation of sealed disc drives, such as those containing low density atmosphere (e.g., a helium-based atmosphere). While the present disclosure is not necessarily so limited, various aspects of the disclosure may be appreciated through a discussion of examples using this context.

Various example embodiments are directed to an apparatus that evacuates a cavity of a chamber, fills the cavity with a gas, and seals the cavity with the gas therein. Such embodiments may be implemented to minimize a loss of fill gas during the sealing process, and to facilitate relatively rapid and reliable manufacturing. Certain embodiments involve creating a seal between the apparatus and the cavity of the chamber, utilizing a vacuum to remove an atmosphere from the cavity, and subsequently filling the cavity with the fill gas and applying a seal that seals the fill gas therein. Conducting the evacuation and filling steps in series (with a single apparatus) prevents the fill gas from also being evacuated from the cavity. In many embodiments of the present disclosure, the fill gas is a low-density atmosphere (e.g., helium). Many low-density atmosphere gases are not readily available in nature and can render the assembly of a disc drive cavity with such a low-density atmosphere cost prohibitive, particularly where a portion of the low-density atmosphere is lost during evacuation of the cavity. Aspects of the present disclosure mitigate escape of the fill gas from the cavity of the disc drive, both during and after assembly by conducting several steps of the disc drive assembly in a sealed environment.

Embodiments of the present disclosure are further directed to a manufacturing apparatus that partially assembles a disc drive in a sealed atmospheric environment. The manufacturing apparatus implements the steps of the assembly in the sealed atmospheric environment to minimize the use of resources required to produce the disc drive (e.g., a low-density atmosphere). In many embodiments, the manufacturing apparatus positions itself, relative to the open cavity of the disc drive, and forms a seal between a chamber of the manufacturing apparatus and the open cavity of the disc drive. The manufacturing apparatus evacuates the chamber, thereby drawing a vacuum in the cavity of the disc drive sealed thereto. Once a vacuum has been established in the cavity, the manufacturing apparatus fills the cavity with a gas. The vacuum in the cavity of the disc drive facilitates the filling of the cavity with the gas. By evacuating the cavity prior to filling the cavity with the gas, the purity of the gas in the cavity can be controlled. In disc drives designed to operate in a certain gas or atmospheric environment, the existence of other gases within the cavity (such as when the cavity is not evacuated prior to filing the cavity with the certain gas) may cause disc drive performance degradation and can even lead to eventual failure of the disc drive over time. Aspects of the disclosure address such issues, by hermetically sealing the disc drive cavity after it has been filled with the gas (and to prevent other gases external to the disc drive from penetrating into the cavity and mixing with the gas therein).

In one exemplary embodiment, a cavity of a disc drive encompasses a data storage medium and a transducer that floats above a surface of the storage medium and accesses data thereon as the data storage medium rotates. The storage medium is sealed within a pure or nearly pure helium environment (e.g., at 0.5 atm), using approaches as characterized herein. This environment and pressure can facilitate desirable fly-height of the transducer above the storage medium, as provided via componentry such as a slider that positions the transducer. This approach can address issues that may arise, for example, with incomplete evacuation of the disc drive. For instance, where an earth atmosphere is not (completely) removed from the cavity of the disc drive prior to filling the cavity with helium, the resulting mixture within the cavity may cause a slider or other componentry to deviate, affecting the desired fly-height and preventing the transducer from properly accessing data on the storage medium. Accordingly, aspects of the present disclosure ensure the proper consistency, volume, and pressure of the gas injected into the cavity of the disc drive.

One or more of these embodiments may be particularly applicable, for example, to disc drives in which a cavity between a base deck and a cover is hermetically sealed with a low-density atmosphere in the cavity. In such embodiments, the low-density atmosphere may be used to facilitate reduced power requirements for a data storage. In this context, aspects of the present disclosure facilitate filling of the cavity with an atmosphere free of undesirable atmospheric characteristics by entirely evacuating the cavity of the disc drive prior to filing the cavity with the low-density atmosphere. To further facilitate proper operation of the disc drive over its operational lifespan, the cavity is hermetically sealed to maintain the atmosphere within the disc drive, and to prevent the egress of external gases into the cavity. The atmosphere filled into the cavity may include one or more of a plurality of gases intended to give the atmosphere desirable characteristics. For example, improved heat transfer out of the disc drive (high heat transfer co-efficient), reduced atmospheric resistance (low-density), etc.

Various example embodiments are directed to apparatuses including a first chamber having a first cavity and an opening thereto. The opening of the first chamber is aligned to an opening of a second chamber having a second cavity, and the first cavity is sealed to the cavity via the opening by a first actuator. Once the first cavity and second cavity are sealed to one another, gas flow componentry in conjunction with the first actuator and first chamber evacuate the second cavity, via the openings, by drawing a vacuum in the first cavity. The gas flow componentry, after evacuating the second cavity, fills the second cavity with a gas via the openings by introducing the gas to the first cavity. The vacuum in the second cavity draws the gas in the first cavity to the second cavity. In various embodiments, the gas has a density that is less than air. Once filled with gas, a second actuator (hermetically) seals the gas in the second cavity by applying a seal that covers the opening in the second chamber. In further more specific embodiments, the first actuator seals the first cavity to the second cavity by compressing a seal between respective surfaces of the first chamber and the second chamber, therein providing a contiguous sealed passage between the first cavity and the second cavity.

In various embodiments, gas flow componentry includes valving and gas channel componentry that evacuates a second cavity of a second chamber by operating the valving to couple a vacuum to a first cavity of a first chamber, where the first chamber is aligned with and coupled to the second chamber. The valving is then operated to decouple the vacuum from the first chamber, while maintaining a vacuum in the first and second cavities. After the vacuum has been decoupled from the first chamber, the valving is operated to couple a gas supply to the first cavity, which is drawn to the second cavity by the vacuum therein, thereby filling the second cavity with the gas. In yet more specific embodiments, the gas supply includes a vessel pressurized with the gas and a gas channel that couples the vessel to the first chamber. In some implementations, a vacuum pump is coupled to the first chamber via the gas channel componentry and draws the vacuum in the first chamber. In further embodiments, a vacuum tank is coupled to the first chamber via the gas channel componentry, and operates with the valving to evacuate the second cavity when coupled to the first chamber by drawing a vacuum therein.

Embodiments of the present disclosure are directed to hard disc drives including a chamber that encloses hard disc drive components, such as a spindle and a rotatable storage medium, in a cavity. The spindle includes a seal that mitigates outflow of lubricant from the spindle by coupling control signals to the hard disc drive while the gas flow componentry evacuates the second cavity, and using the control signals to rotate the rotatable storage medium. In more specific embodiments, the hard disc drive includes a pressure sensor that is implemented with a control interface and gas flow componentry to ascertain pressure in the cavity, and to control evacuation and/or filling of the second cavity based on the data accessed from the pressure sensor.

The cavities and chambers as characterized herein may be sealed in a variety of manners, upon filling with a gas. In some embodiments, an actuator seals gas in a chamber by applying a physical seal that covers an opening in the chamber. The actuator collects the seal, places the seal over the opening and adheres the seal to the chamber. In some embodiments, the seal is collected by extending such an actuator out of a first cavity as characterized above, and drawing the seal into the first cavity before the first cavity is sealed to the second cavity (also above). In certain embodiments, the actuator collects the seal via magnetic forces, and the seal is adhered to the chamber by pressing an adhesive on the seal onto the chamber.

In other embodiments, a hard disc drive assembly apparatus includes an evacuation/fill chamber having an opening thereto, a mechanical that positions a hard disc drive relative to the chamber, with the opening in the chamber being positioned in communication with an opening in the hard disc drive. An actuator seals the evacuation/fill chamber to the hard disc drive via the openings, and gas flow componentry evacuates a cavity in the hard disc drive, via the openings, by drawing a vacuum in the chamber. Once evacuated, the disc drive cavity is filled with a gas by introducing the gas to the evacuation/fill chamber, which flows into the hard disc drive. Another actuator then applies a seal to cover the opening in the disc drive while the chamber is sealed to the disc drive cavity, therein sealing the gas in the disc drive cavity. In further embodiments, the mechanical component includes a conveyor that moves the hard disc drive in position, relative to the chamber, and operates in conjunction with the chamber, actuators and gas flow componentry to evacuate and fill respective ones of the disc drives as they are conveyed.

Turning now to the figures, various embodiments of the present disclosure are presented by way of the illustrations.

FIG. 1 shows a system 100, consistent with various aspects of the present disclosure. The system 100 includes a first chamber 105 with a first cavity 106, and a second chamber 110 with a second cavity 111. A first actuator 115 aligns first opening 108 of the first chamber 105 relative to second opening 112 of the second chamber 110. It is to be understood that the first actuator 115 may align the openings 108 and 112 in a number of ways, such as by: moving the first chamber 105 relative to a position of the second chamber 110, vice versa, simultaneously moving both the first chamber 105 and second chamber 110, or manipulating a surface (e.g., conveyor belt) that one or both of the chambers are resting on. Once the openings 108 and 112 of the two cavities 106 and 111 are aligned, an interface 107 seals the cavities 106 and 111 to one another.

In various embodiments consistent with FIG. 1, valving and control circuitry 125 selectively couples a vacuum supply 135 to the first cavity 106 of the first chamber 105. More specifically, while the cavities 106 and 111 are sealed to one another via the interface 107, the vacuum supply 135 is coupled to the first chamber 105 to create a vacuum therein. The vacuum in the first chamber 105 evacuates gas from the second chamber 110 to draw a vacuum in the second chamber via the openings 108 and 112. After drawing the vacuum in the second chamber 110, the valving and control circuitry 125 decouples the vacuum supply 135 from the first chamber 105. The valving and control circuitry 125 then couples the gas supply 130 to the first chamber 105, which flows into the second chamber 110 through the openings 108 and 112, filling the second chamber with the gas while the interface 107 maintains the seal between the respective cavities 106 and 111. The gas supply 130 is then decoupled from the first chamber 105. While the interface 107 maintains the seal between the first and second cavities 106 and 111 and the gas therein, the second chamber 110 is sealed from the first chamber 105 by a seal applied to the second opening 112 by a second actuator 120. The seal contains the gas in the second cavity 111 of the second chamber 110.

Figure 2:
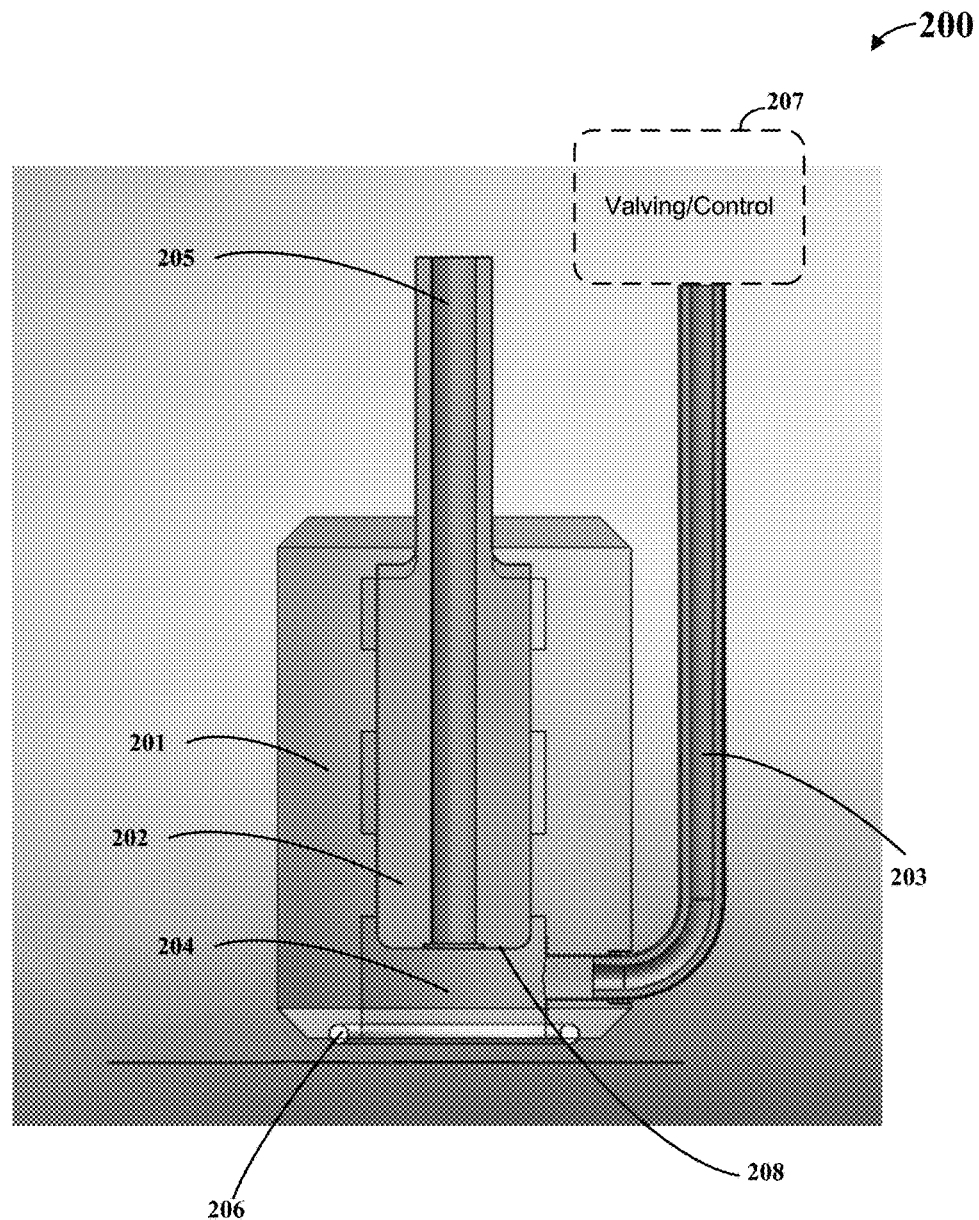
FIG. 2 is a cross-sectional side view of a disc drive sealing apparatus, consistent with various aspects of the present disclosure.

FIG. 2 is a cross-sectional side view of a sealing apparatus 200, consistent with various aspects of the present disclosure. The apparatus 200 includes a body 201 that houses an actuator 202, an evacuation/fill supply 203 and a chamber 204. A seal 206, such as an O-ring, is operable to seal chamber 204 to an enclosure (e.g., such as a disc drive), with the seal 206 pressed upon the enclosure. The evacuation/fill supply 203 is operable to, when sealed to an opening in an enclosure, evacuate the chamber 204 (and therein evacuate the enclosure), and subsequently fill the chamber 204 with a gas such as helium (and therein fill the enclosure). In various implementations, valving and control componentry 207 is operable to couple a vacuum to the chamber 204 via the evacuation/fill supply 203, and upon drawing of a vacuum on an external chamber sealed thereto, couple a gas supply to the chamber via evacuation/fill supply 203 and therein fill the external chamber with gas.

The actuator 202 is operable to extend and retract vertically relative to the body and a chamber 204 therein, to collect a seal at a bottom surface 208 and to press such collected seals over an opening in an underlying cavity, therein sealing the cavity. The actuator 202 is operable to collect and place the seal in a variety of manners. In some instances, the actuator 202 includes a magnetic component that picks up the seal at bottom surface 208 of the actuator. In other instances, a vacuum is created that collects the seal (e.g., within a vacuum tube 205), and is released for placing the seal.

The apparatus 200 may be implemented in a variety of manners, such as during final assembly of a disc drive utilizing low-density atmosphere, for evacuating and filling a cavity with the low-density atmosphere, and further for sealing the cavity to prevent leakage. Such approaches may be used to seal a cavity similar to 111 in FIG. 1. In some embodiments, the apparatus 200 is manipulated relative to a cavity to be filled, by moving one or both of the apparatus and the cavity and applying pressure that engages the seal 206 onto the cavity. Once placed, the cavity is evacuated and then filled with gas in a manner such as may be consistent with the above, after which the actuator 202 extends to apply an adhesive seal to the cavity.

In some implementations, the actuator 202 collects the adhesive seal prior to the apparatus 200 being sealed to the cavity, and retracts into the apparatus 200 while the cavity is evacuated and filled. After filling, the actuator 202 extends, adhering the adhesive seal to the cavity and therein sealing an opening therein, maintaining the gas within the cavity. This approach may involve, for example, cavities with covers/surfaces that are generally planar, or with cover/surfaces having a protrusion that extend into the chamber 204 for evacuation/filling and adhesively sealing.

Figure 3:
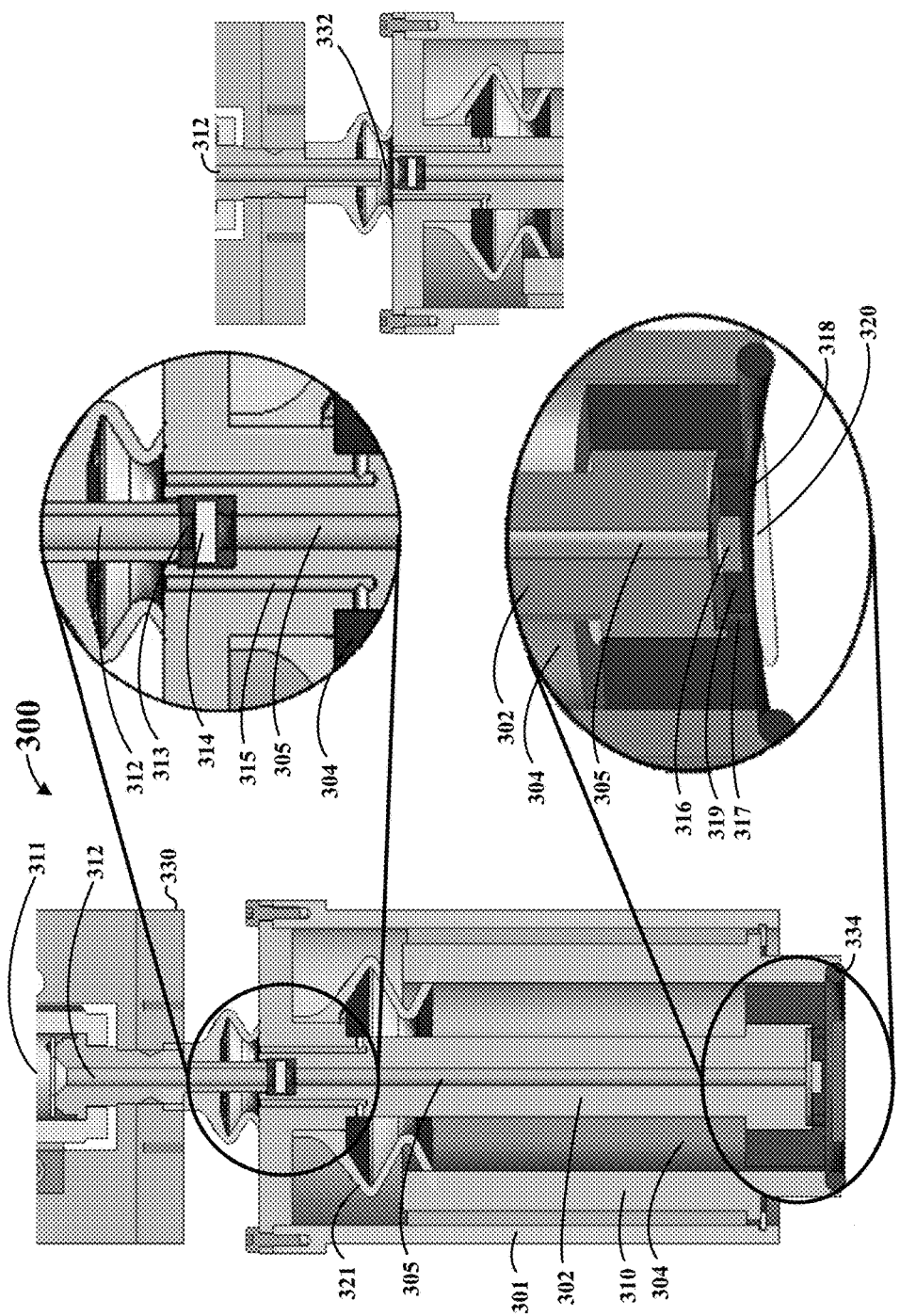
FIG. 3 is a cross-sectional side view of a disc drive sealing apparatus, consistent with various aspects of the present disclosure.

FIG. 3 shows a cross-section of an apparatus 300, consistent with various aspects of the present disclosure. The apparatus 300 includes an orifice 311 through which a vacuum may be drawn and/or gas may be introduced, via tube 312. A flexible membrane 321 allows a lower housing 310 to move relative to housing 301. The apparatus 300 is shown in an orientation for picking-up a seal 320. The lower housing 310 can be extended from housing 301 to place a manipulator 319 at the end of internal shaft 302 into contact with the seal 320 along a bottom surface 318 of the manipulator 319. Optionally, where the seal 320 includes ferromagnetic materials, a magnet 316 may be located within the manipulator 319 to couple the seal to the bottom surface 318 of the manipulator.

A vacuum may be applied to a top surface of seal 320 to adhere the seal to bottom surface 318 of the manipulator 319. In such an embodiment, the tube 312 (and platen 330) can be positioned as shown on the left side of FIG. 3 with an end of the tube 312 positioned relative to an O-ring 313 that seals the tube to a flow restrictor 314 and to a further vacuum tube 305. The vacuum is extended to the top surface of the seal 320 via vacuum passage 317. Accordingly, when a vacuum is applied to an upper portion of the tube 312 in the position as shown, the seal 320 is temporarily coupled to the bottom surface 318 of the manipulator 319. In this position, while picking up seal 320 the tube 312 isolates cavity 304 from the vacuum source.

When the tube 312 is retracted to leave gap 332 (as shown on the right side of FIG. 3), the tube 312 no longer seals off the cavity 304 and the orifice 311 is coupled to the cavity 304. With the tube 312 in this retraced position and with seal 334 pressed against an external chamber surface and covering/sealing an opening in the external chamber, a vacuum may be drawn in the external chamber after which gas may be filled therein, via cavity 304, evacuation path 315 and orifice 311. After the external chamber is evacuated and subsequently filled, the apparatus 300 is actuated downward such that seal 320 is coupled to the chamber, sealing the opening therein (and thus sealing the gas within the chamber). For instance, with housing 301 articulated downward upon a surface of the chamber, the resulting force may move the lower housing 310 upward with the seal 320 moving with the housing 301, applying the seal to the external chamber.

Figure 4:
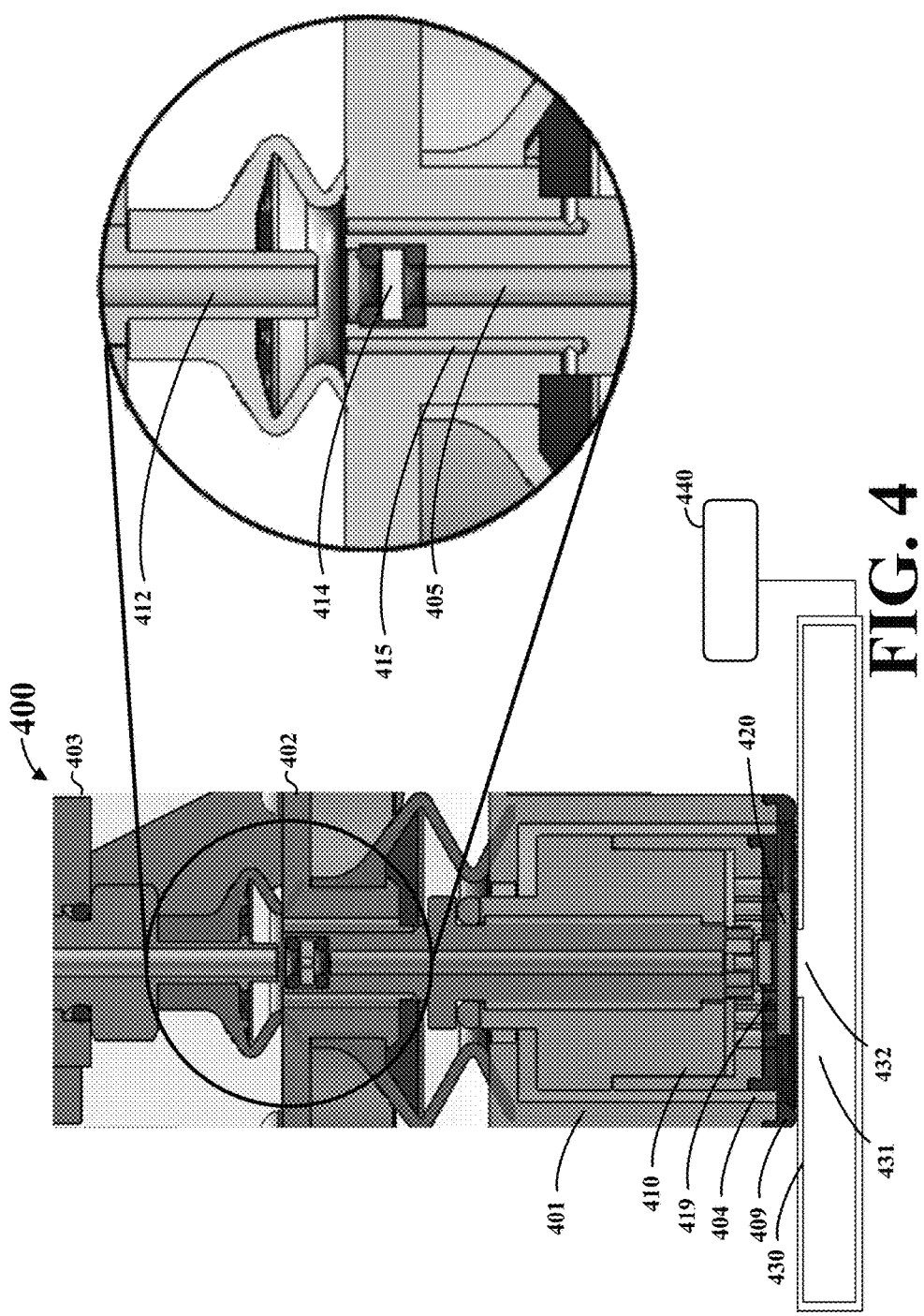
FIG. 4 is a cross-sectional side view of a disc drive sealing apparatus, consistent with various aspects of the present disclosure.

FIG. 4 shows a cross-sectional view of an apparatus 400, consistent with various aspects of the present disclosure. The apparatus 400 may, for example, be implemented for evacuating and subsequently re-filling filling an enclosure as discussed herein, with enclosure 430 shown by way of example. The apparatus 400 includes housing 401, platen 402 and platen 403 that can be moved independent of one another for picking up, a seal, evacuating/filling a chamber, and placing the seal. Such an approach may be carried out, for example, as shown in and described in connection with FIGS. 6A, 6B and 6C.

The housing 401 and movable component 410 move relative to one another, facilitating extension of manipulator end 419 out of, and retraction back into, the housing 401. This facilitates picking and placing of a seal 420 with a manipulator end 419, and evacuation/filling of enclosure 430 with the housing 401 extending beyond the manipulator end 419 (in the position shown in FIG. 4).

As shown in the inset, tube 412 is moved with platen 403 relative to platen 402, and is shown in a position that is disengaged from a flow restrictor at 414. In this position, gas may flow through the tube 412 and passage 415 via chamber 404. When platen 403 and 402 are moved toward each other, the tube 412 engages with the flow restrictor 414 and flows gas (e.g., draws a vacuum) via tube 405. For this latter engagement, reference may be made to FIG. 6A or FIG. 6C.

The apparatus 400 may be operated in a variety of manners. In one implementation, the apparatus 400 is placed into contact with a top surface of enclosure 430 and a temporary seal, via O-ring 409, is formed between chamber 404 and a cavity 431 of the enclosure 430. A vacuum is drawn via opening/port 432, via chamber 404, passage 415 and tube 412. After evacuation, a low-density gas is injected into the cavity 431 via the same path used for the vacuum, while the O-ring 409 maintains a seal. After filling, the apparatus 400 is actuated such that the housing 401 moves relative to the movable component 410, resulting in the seal 420 being applied to the upper surface of the enclosure 430 while the O-ring 409 continues to maintain the seal. Once the seal 420 is in place, the apparatus 400 can be removed.

In some embodiments, enclosure 430 is implemented with a hard disc drive. A control interface 440 operates to communicate with the enclosure 430. This communication may, for example, involve spinning a spindle (and storage medium coupled thereto) of the hard disc drive during evacuation and/or fill of the cavity 431. This approach can mitigate leakage of lubricant from the spindle. In connection with these and/or other embodiments, the control interface 440 may be used to collect data from a pressure sensor within the hard disc drive. The collected data is used to control one or both of evacuation and filling with the apparatus 400. For instance, evacuation can be carried out until a pressure reading indicates a vacuum level deemed to be sufficient. Similarly, filling can be carried out until a pressure reading indicates a sufficient pressure for final sealing.

Figure 5:
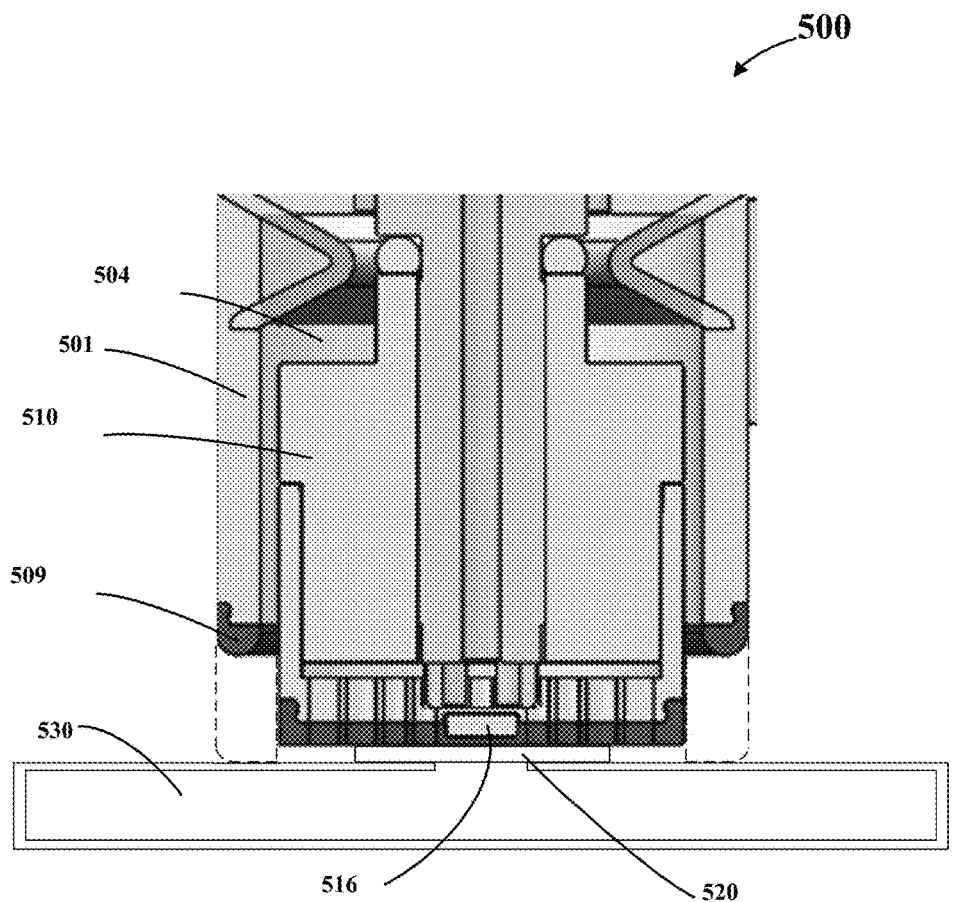
FIG. 5 is a cross-sectional side view of a disc drive sealing apparatus, consistent with various aspects of the present disclosure.

FIG. 5 shows a partial cross-sectional side view of an apparatus 500 showing a final step of an evacuate fill and seal process, as may be implemented in connection with various embodiments. The apparatus 500 may, for example, be implemented in a manner similar to that shown with FIG. 4, with similar reference numbers being used for similar components. With housing 501 sealed to enclosure 530 via O-ring 509 (shown by dashed lines) and a gas filled therein, movable component 510 (e.g., a cylinder) is actuated relative to the housing to apply seal 520 to an upper surface of the enclosure 530, sealing an opening therein. After applying the seal 520, the apparatus 500 can be refracted from the top surface of the enclosure 530 in the position as shown.

In some implementations, magnet 516 is used to hold seal 520 (with the seal being magnetic), and an adhesive between the seal 520 and the top surface of enclosure 530 is implemented with a strength greater than that of the magnet.

FIGS. 6A-6C show an apparatus 600 in various stages of operation, in accordance with one or more embodiments. The apparatus 600 may, for example, be implemented with the apparatus 400 shown in FIG. 4 and/or the apparatus 500 shown in FIG. 5, and as such various discussion is omitted. In FIG. 6A, the apparatus is shown with a lower portion extended for coupling to/picking-up a seal. In FIG. 6B, the apparatus 600 is shown pressed to an upper surface of an enclosure 630, with O-ring 609 forming a seal between the apparatus and the enclosure, and the seal 620 being retracted within the apparatus 600 via relative movement of platens within the apparatus 600 as shown. In this position, the enclosure 630 may be evacuated and subsequently filled, such as described above. Once filled, the seal 620 is moved toward and adhered to the enclosure 630 with the O-ring 609 in contact with the enclosure. After the seal 620 is pressed onto the enclosure, the outer housing 601 can be retracted as shown in FIG. 6C while pressure is maintained on the seal as shown in FIG. 6C.

Based upon the above discussion and illustrations, those skilled in the art will readily recognize that various modifications and changes may be made to the various embodiments without strictly following the exemplary embodiments and applications illustrated and described herein. For example, the design of the manufacturing apparatus for evacuating an atmosphere within a cavity, and filling the cavity with another atmosphere readily encompasses a wide variety of configurations, assembly techniques, and atmosphere delivery methodologies that are readily understood in view of the present disclosure. Such modifications do not depart from the true spirit and scope of various aspects of the disclosure, including aspects set forth in the claims.

What is claimed is:

1. An apparatus comprising:
   a first chamber having a first cavity and an opening thereto;
   a first actuator configured and arranged to align the opening of the first chamber to an opening in a second chamber having a second cavity, and to seal the first cavity to the second cavity via the openings;
   gas flow componentry configured and arranged with the first actuator and first chamber to, with the first cavity sealed to the second cavity,
      evacuate the second cavity via the openings by drawing a vacuum in the first cavity, and
      after evacuating the second cavity, filling the second cavity with a gas via the openings by introducing the gas to the first cavity; and
   a second actuator configured and arranged to, with the first cavity sealed to the second cavity, seal the gas in the second cavity by applying a seal that covers the opening in the second chamber.

2. The apparatus of claim 1, wherein the first actuator is configured and arranged to seal the first cavity to the second cavity by compressing a seal between respective surfaces of the first chamber and the second chamber, therein providing a contiguous sealed passage between the first cavity and the second cavity.

3. The apparatus of claim 1, wherein the gas flow componentry includes valving and gas channel componentry configured and arranged to evacuate the second cavity by operating the valving to couple a vacuum to the first chamber, and
introduce the gas to the first cavity by operating the valving to decouple the vacuum from the first chamber, while maintaining a vacuum in the first and second cavities, and thereafter operating the valving to couple a gas supply to the first cavity.

4. The apparatus of claim 3, further including the gas supply, the gas supply including a vessel pressurized with the gas and a gas channel that couples the vessel to the first chamber.

5. The apparatus of claim 4, further including a vacuum pump coupled to the first chamber via the gas channel componentry, the vacuum pump being configured and arranged to draw the vacuum in the first chamber.

6. The apparatus of claim 5, further including a vacuum tank coupled to the first chamber via the gas channel componentry, the valving and the vacuum tank being configured and arranged to evacuate the second cavity by coupling the vacuum tank to the first chamber.

7. The apparatus of claim 3, further including a vacuum tank coupled to the first chamber via the gas channel componentry, the valving and the vacuum tank being configured and arranged to evacuate the second cavity by coupling the vacuum tank to the first chamber.

8. The apparatus of claim 3, further including a vacuum pump coupled to the first chamber via the gas channel componentry, the vacuum pump being configured and arranged to draw the vacuum in the first chamber.

9. The apparatus of claim 3, further including a vacuum tank coupled to the first chamber via the gas channel componentry, the valving and the vacuum tank being configured and arranged to evacuate the second cavity by coupling the vacuum tank to the first chamber.

10. The apparatus of claim 1, wherein the second chamber is a chamber of a hard disc drive having a spindle and a rotatable storage medium in the second cavity, further including a control interface configured and arranged to mitigate outflow of lubricant from the spindle by coupling control signals to the hard disc drive while the gas flow componentry evacuates the second cavity, the control signals being operative to rotate the rotatable storage medium.

11. The apparatus of claim 10, wherein
    the hard disc drive includes a pressure sensor,
    the control interface is further configured and arranged with the gas flow componentry to access pressure sensor data from the pressure sensor, and control at least one of the evacuation of the second cavity and filling of the second cavity with the gas based on the data accessed from the pressure sensor.

12. The apparatus of claim 1,
    wherein the second chamber includes a pressure sensor, and
    further including a control interface configured and arranged with the gas flow componentry to access pressure sensor data from the pressure sensor, and to control at least one of the evacuation of the second cavity and filling of the second cavity with the gas based on the data accessed from the pressure sensor.

13. The apparatus of claim 1, wherein the second actuator is configured and arranged to collect the seal, place the seal over the opening in the second chamber, and adhere the seal to the second chamber.

14. The apparatus of claim 13, wherein the second actuator is configured and arranged to collect the seal by extending out of the first cavity and drawing the seal into the first cavity, prior to the first cavity being sealed to the second cavity.

15. The apparatus of claim 13, wherein the second actuator is configured and arranged to collect the seal via magnetic forces, and to adhere the seal to the second chamber by pressing an adhesive on the seal, onto the second chamber.

16. The apparatus of claim 1, wherein the gas flow componentry is configured and arranged to fill the second cavity with a gas having a density that is less than air, and the second actuator is configured and arranged to hermetically seal the gas in the second cavity.

* * * * *